United States Patent [19]

Lucken

[11] 4,453,729

[45] Jun. 12, 1984

[54] OCCUPANT PROPELLABLE WHEELCHAIR

[76] Inventor: Wesley O. Lucken, 1149 S. Chantilly, Anaheim, Calif. 92806

[21] Appl. No.: 420,034

[22] Filed: Sep. 20, 1982

[51] Int. Cl.[3] .................. B62M 1/16

[52] U.S. Cl. .................. 280/242 WC; 74/141; 192/46; 280/244; 280/253; 297/DIG. 4

[58] Field of Search .................. 280/211, 241, 242 R, 280/242 WC, 244, 246, 253, 255; 297/DIG. 4; 192/30 R, 46; 74/138, 141

[56] References Cited

U.S. PATENT DOCUMENTS

| | | | |
|---|---|---|---|
| 2,621,678 | 12/1952 | Snyder et al. | 74/141 |
| 3,309,110 | 3/1967 | Bulmer | 280/242 R |
| 3,666,292 | 5/1972 | Bartos | 280/234 |
| 3,877,725 | 4/1975 | Barroza | 280/242 WC |
| 3,994,509 | 11/1976 | Schaeffer | 280/242 WC |
| 4,274,651 | 6/1981 | Dumont | 280/242 WC |

FOREIGN PATENT DOCUMENTS

| | | | |
|---|---|---|---|
| 4473 | of 1882 | United Kingdom | 280/253 |

*Primary Examiner*—Joseph F. Peters, Jr.
*Assistant Examiner*—D. Lynn Fugate
*Attorney, Agent, or Firm*—K. H. Boswell; Edward D. O'Brian

[57] ABSTRACT

A wheelchair having a frame capable of supporting the occupant includes a plurality of wheels including two driving wheels. Left and right side levers are mounted on the wheelchair such that the tops of the levers can be moved back and forth reciprocally toward and away from the occupant of the wheelchair. When the levers are in a position towards the occupant of the wheelchair, they are in a neutral position and by pushing away from the occupant from the neutral position to a displaced position, a power stroke is performed. Movement of the levers in the reverse direction back toward the occupant constitutes a return stroke of the same. A power transfer mechanism includes a first and second ratchet operatively associated with each of the driving wheels. The first ratchet allows the driving wheel to free wheel at all times in a forward direction. The second ratchet allows the driving wheel to free wheel in both a forward and reverse direction whenever the lever associated with that wheel is in the neutral position, and as the lever is moved in the power stroke away from the occupant, the second ratchet transfers this movement through the first ratchet to rotate the driving wheel in the forward direction. The second ratchet transfers no movement to the first ratchet as the lever moves back toward the occupant in the return stroke.

9 Claims, 7 Drawing Figures

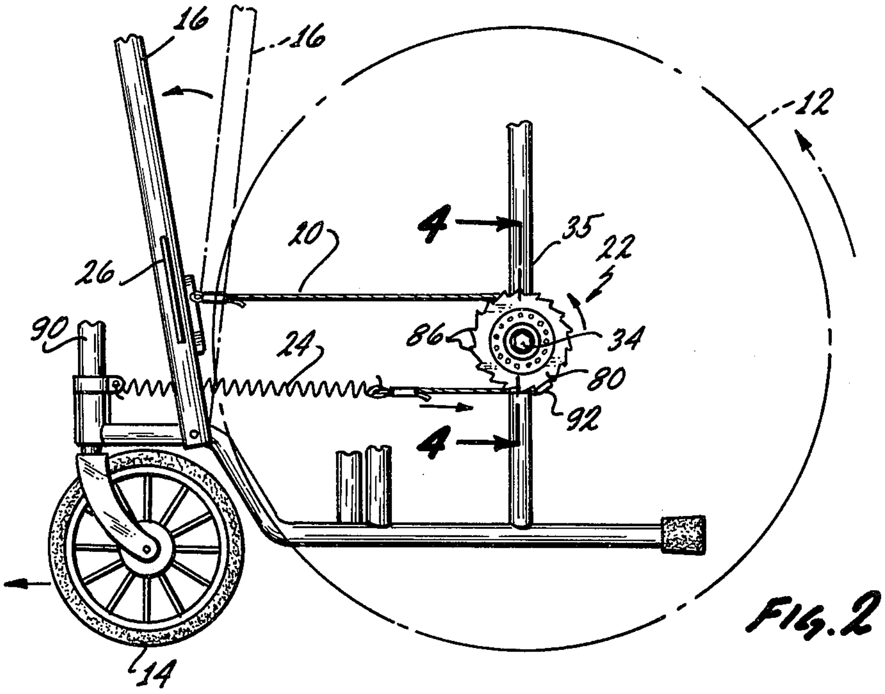
FIG. 2
FIG. 3
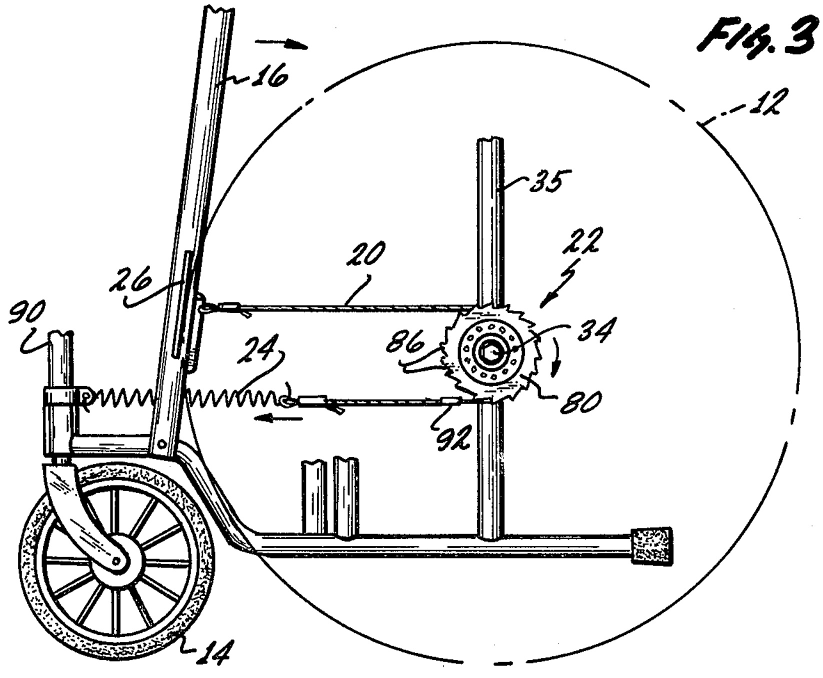

OCCUPANT PROPELLABLE WHEELCHAIR

BACKGROUND OF THE INVENTION

This invention is directed to an improvement in a wheelchair wherein the wheelchair can be powered by the occupant therein by the occupant pushing a lever away from the occupant. Movement of the lever transfers power to the appropriate driving wheel of the wheelchair to propel the wheelchair. When the lever is in a neutral position, however, the wheelchair is capable of being moved by more conventional methods such as using the push rims normally attached to the wheels of the wheelchair, or by pushing by an assisting person in the normal manner.

Many wheelchairs augmented with devices wherein the occupant of the wheelchair can propel himself have been developed. Typical of such wheelchairs are those in U.S. Pat. Nos. 3,994,509; 3,309,110; 3,877,725; 3,666,292 and 4,274,651. In the U.S. Pat. No. 3,994,509 an extensive discussion is directed to certain of the negative aspects of many of the prior known wheelchairs which have been augmented with devices for self-propulsion. Others of the patents listed in this paragraph also have such discussions.

One thing which can be gleaned by reviewing the patents which have issued in this art area is that there is a lot of disagreement as to what is advantageous and what is disadvantageous in devices of this type. Certain inventors have deemed it disadvantageous to only get power from one of a forward or reverse stroke of devices utilizing levers capable of being pushed back and forth. To this end, U.S. Pat. Nos. 3,994,509 and 3,666,292 have developed systems wherein the power of both the forward and reverse stroke is utilized. U.S. Pat. No. 4,274,651 skirts the probiem entirely by sustituting rotating cranks instead of levers which can be moved back and forward.

U.S. Pat. No. 3,309,110 develops its power stroke in returning the lever back toward the occupant of the chair and teaches the use of a "Y" shaped apparatus which enables the lever to be gripped with something other than a fist, such as positioning the wrist within the "Y" shaped apparatus.

U.S. Pat. No. 3,877,725 teaches utilizing the forward motion of the lever as the power stroke in a normal instance, and the adaptation of the mechanism such that, to go backwards, a rearward stroke of the lever can be utilized.

While all of the above noted patents certainly have their individual, unique advantages, it is deemed that all of them also suffer with certain defects.

As U.S. Pat. No. 3,309,110 notes, many of the persons confined to wheelchairs and the like do not have use of their fists sufficiently such that they can grip a lever or a crank and hold on to the same while pushing or rotating. This patent, as noted above, attempted to solve this problem by utilizing a "Y" shaped member which can be cocked around the wrist. If a person confined to a wheelchair suffers from arthritis or the like, deformities of the hands and wrists are quite frequent. Because of the pain associated with the joint, even the use of the "Y" shaped member of U.S. Pat. No. 3,309,110 could be precluded. Further, any wheelchair having propulsion levers, cranks, or the like, which require the pulling of the lever back toward the occupant during all of or a portion of the power stroke, continually direct a force on to the occupant, sliding the occupant forward on the seat in response to the pulling of the lever backward by the occupant. While this does not constitute a problem in those individuals who are fairly heavy, in the handicapped person who carries little body weight, the constant tugging of this perkson's lighter body forward, in attempts to pull back on the lever in a power stroke, can lead to failure of acceptance of use of the device by such a person.

It could then be summed up that, with regard to the direction of stroke of a lever, crank or the like, because of gripping problems and because of body weight problems, it is considered advantageous to utilize as a power stroke a movement away from the body of the occupant of the chair. Because of this factor, many of the known prior devices in this art area are thus excluded.

Additionally, many of the wheelchairs equipped with self-propelling devices do not allow for disattachment of these devices from the driving wheels or, if the devices can be disattached from the driving wheels, detachment is inconvenient and sometimes impractical. U.S. Pat. No. 3,994,509 provides a simple push button for detaching the interconnection between its driving levers and the driving wheels. Unfortunately, if a hand is occupied in depressing the push button, that same hand cannot be utilized to move the wheels in the more conventional manner by pushing on the push rims normally attached to the side of the wheels of the wheelchair. U.S. Pat. No. 3,666,292 provides no means for disattaching levers, such that whenever the wheelchair is moving, the levers are continually oscillating back and forth, which can serve as a hazard. Many times, the occupant of the wheelchair wishes to utilize the push rims on the individual wheels for moving short distances, turning in circles or, at other times, the occupant of the wheelchair simply lets another person push him around utilizing the gripping means normally found on the upper back of the wheelchair.

In those instances when the occupant of the wheelchair wishes either someone else to push him, or wishes to push himself, or move himself via the push rims on the wheels, placement of any levers or the like which continually oscillate, such as those in U.S. Pat. No. 3,666,292, or which are in the way of use of the push rims such as those seen in U.S. Pat. No. 3,309,110, is considered disadvantageous.

In view of all of the problems discussed above, it is considered that while many approaches have been taken toward providing a wheelchair which is conveniently used by the occupant therein to propel himself, each of the known devices suffer from one or several defects which has prevented wide acceptance and use of these type of devices.

BRIEF DESCRIPTION OF THE INVENTION

In view of the above, it is therefore a broad object of this invention to provide a wheelchair which can be freely pushed by another person in both a backward and forward diection without the disengagement of any parts, components or the like. It is a further object to provide a wheelchair that is capable of being utilized in a normal manner by the occupant therein in propelling the occupant backward or forward utilizing arm and hand movement on the push rims formed on the outboard side of the driving wheels. It is a further object of this invention to provide a wheelchair which has means thereon wherein the occupant of the wheelchair can propel himself by pushing with his arms away from his body against a lever or the like in a power stroke. It is a further object of this invention to provide a wheelchair wherein the drive wheels are completely free wheeling in a forward direction with regard to the driving mechanism such that the forward speed of the wheelchair is not inhibited by the back and forth speed of the driving mechanism but, in fact, the wheelchair is capable of being accelerated to a fairly rapid velocity by users thereof when participating in sporting events devoted strictly to the users of wheelchairs such as marathons, sprints, use on the backetball court or the tennis court. It is a further object to provide a wheelchair which, while being propelled in a forward manner by the propelling device, is inhibited from moving backwards such that the chair can be safely negotiated up a ramp or the like, utilizing the propelling device without fear of the chair rolling backwards. Additionally, it is an object to provide a wheelchair which is capable of being braked to inhibit or stop all forward velocity.

Furthermore, it is considered that it is advantageous to provide a device which is capable of being attached to existing wheelchairs manufactured utilizing certain standard techniques, or can be built into new designs of wheelchairs wherein the device is an inherent part of the wheelchair. Furthermore, because of the continued daily use of the chair and the device, any such device must be so engineered so as to be capable of a long and useful lifetime.

These and other objects, as will become evident from the remainder of this specification are achieved in an occupant propellable device which comprises: a frame capable of supporting said occupant; a plurality of wheels rotatably mounted on said frame; at least one of said wheels comprising a driving wheel; at least one movable means mounted on said frame, at least a portion of said movable means reciprocally movable back and forth away from and towards the occupant from a neutral position towards said occupant to a displaced position away from said occupant, said movable means movable in a power stroke wherein said movable means moves in a direction away from said neutral position and said occupant towards said displaced position and said movable means movable in a return stroke wherein said movable means moves in the direction from said displaced position back towards said neutral position and said occupant; at least one transfer means rotatably mounted on said frame in association with said driving wheel and said movable means; said transfer means including a first and a second ratchet means; said first ratchet means operatively associated with said driving wheel, said first ratchet means allowing said driving wheel to free wheel in the forward direction of movement of said device; said second ratchet means operatively associated with said first ratchet means and said movable means, said second ratchet means allowing said driving wheel to free wheel in both said forward direction and the reverse direction when said movable means is in said neutral position and said second ratchet means acting through said first ratchet means by engaging with said first ratchet means rotating said driving wheel in said forward direction in response to said movable means moving in said power stroke and said second ratchet means disengaging with said first ratchet means when said movable means moves in said return stroke.

Preferredly, the device of the invention would have both a first and second driving wheel with both a movable means a transfer means associated with each of the driving wheels respectively. Preferredly, the device would comprise a wheelchair with independent first and second main axles with the first and second driving wheels independently rotably mounted on said axles, allowing for convenient folding of the chair or the like.

In the preferred embodiment of the invention each of the movable means would comprise a lever means pivotably mounted to the frame of the wheel chair, with the upper portion of each of the lever means being positioned to be comfortably gripped by the occupant and to be moved reciprocally back and forth in an arc toward and away from the occupant with movement away from the occupant constituting the power stroke. Preferredly, each of the transfer means would further include a member rotatably mounted about one of the respective axle means in association with the respective driving wheel also rotatably mounted on the axle.

Preferredly, the first ratchet means would include one of the member or the driving wheel having a first set of ratchet teeth means located thereon, and having a ratchet engagement means associated with the other of the member or the driving wheel which is capable of engaging the first set of ratchet teeth means in a first instance, and disengaging in a second instance. Preferredly, the second ratchet means would include each of the members having a second set of ratchet teeth means located thereon. A connecting means would attach to the lever means and would be associated with the member with the connecting means including a second engaging means capable of engaging the second set of ratchet teeth means when the lever moves in the power stroke whereby the member is rotated. The second engaging means would disassociate with the second set of ratchet teeth means when the lever would be in the neutral position.

In addition to the preferred embodiments noted above, a brake means could be operatively associated with each of the lever means and would be capable of engaging against the outside periphery of the driving wheels upon movement of the respective lever means backward toward the occupant, away from the respective neutral position. As such, then, the power stroke would be from the neutral position away from the occupant whereas movement of the lever means from the neutral position back to the occupant would engage the brake means against the wheels.

Preferredly, the connecting means would include a flexible connector having ends, with one of the ends attaching to the lever means and the other of the ends having a biasing means which is interspaced between that end and the frame. The flexible connector would engage the member by slidably contacting the member and the second engagement means would include a contact member located on the flexible connector. The contact member would be positioned on the flexible connector such that it disengages from the second set of ratchet teeth means when the lever is in the neutral position and engages with the second set of ratchet teeth means when the lever moves in its power stroke.

BRIEF DESCRIPTION OF THE DRAWINGS

The invention described in this specification will be better understood when taken in conjunction with the drawings wherein:

FIG. 2 is a side elevational view in a larger scale of certain portions of FIG. 1;

FIG. 3 is a side elevational view similar to FIG. 2 with the exception that certain of the components therein are positioned in a different spatial relationship;

This invention utilizes certain principles and/or concepts as are set forth in the claims appended to this specification. Those skilled in the art to which this art pertains will realize that these principles and/or concepts are capable of being utilized in a variety of different embodiments differing from the exact illustrative embodiment utilized herein to illustrate the invention. For this reason, this invention is not to be construed as being limited to the exact illustrative embodiment, but is to be construed only in light of the claims.

DETAILED DESCRIPTION OF THE INVENTION

Prior to a total review of all mechanical components of this invention, it is believed that, by briefly describing certain of the components, and illustrating the manner in which the invention is utilized to propel a wheelchair, a further understanding of the totality of the components will be facilitated.

Figure 1:
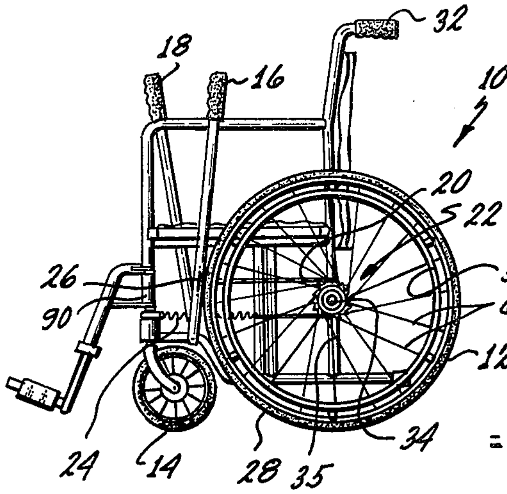
FIG. 1 shows, in side elevation, a wheelchair having this invention attached thereto.

In FIG. 1, there is illustrated a wheelchair 10 of the common type having rear driving wheels, collectively identified by the numeral 12, and front supporting wheels, collectively identified by the numeral 14. These components are attached to respective frame members, not individually identified at this time.

As seen in FIG. 1, the wheelchair 10 includes a left side lever 16 and a right side lever 18. The levers 16 and 18, as well as other components of the invention are identical with each other and only differ in their placement on the respective sides of the wheelchair 10. A cable 20 leads from lever 16 around the back axle spool 22 (identified in greater detail later) and terminates at spring 24. Spring 24 is attached to a portion of the frame and biases the cable taut. A brake 26 is located on the lever 16 and can contact the tread 28 of the driving wheel 12.

The right side lever 18 also includes a cable, axle, spool, spring, brake, etc., as per the left side. For the operation of the wheelchair 10 discussed below, reference will be made to the right lever 18, however, detailed reference to the parts attached thereto will not be made, insofar as their operation is exactly the same as the operation of those parts attached to lever 16.

In FIG. 1, the orientation of lever 16 and 18 with respect to one another are not that which they would assume if the wheelchair 10 was unoccupied as shown in FIG. 1. Both of the levers would be oriented as per lever 16 because of the bias of spring 24. The right side lever 18 is oriented differently to show its placement on the other side of the wheelchair 10.

When the wheelchair 10 is occupied by an occupant and the levers 16 and 18 are in the position as occupied by the lever 16 in FIG. 1, the occupant of the wheelchair 10 can freely move the wheelchair 10 by the push rims 30 formed on the exposed side of the driving wheels 12 in a typical manner common to most wheelchairs. When the levers 16 and 18 are positioned as is lever 16 in FIG. 1, the wheelchair 10 is free to go backward and forward, or spin in circles with one wheel going backward and the other wheel going forward, as is typical for all common wheelchairs, by manipulation of the push rims 30 by the occupant of the chair. Additionally, the handles 32 can be gripped by an auxiliary person to push the chair 10 and the occupant therein, if it is so occupied, backward, forward, up stairs, and the like in the normal manner.

The occupant of the chair can propel himself forward by pushing the levers 16 and 18 away from his body toward the forward end of the chair to cause movement of the cable 20 around the axle spool 22, elongating the spring 24. The movement away from the occupant constitutes the power stroke for the levers 16 and 18. This power stroke need not be a full stroke, but can be a partial stroke, and can be a partial stroke in the area from the occupant to about mid point in the movement of the levers, or from the mid point to the far reach of the levers, or any other portion of the full movement of the levers 16 and 18 from their position toward the occupant to their position distal from the occupant. The lever 16 in FIG. 1 is seen in what can be constituted as a neutral position. At this point, the driving wheels 12 are free to rotate as noted above. As soon as the lever 16 is moved slightly forward from this neutral position, the power stroke starts, and any further forward movement is movement in the power stroke to drive the driving wheels 12 counterclockwise, as seen in FIG. 1, to propel the chair 10 to the left, as seen in FIG. 1.

The individual levers 16 and 18 can be moved in unison, backward and forward together to drive the wheelchair 10 in a straight direction, or one or the other of the levers can be moved in the power stroke while the other is held stationary to cause the driving wheel 12 associated with the particular lever, whether it be lever 16 or 18, to rotate while the other remains static, or free wheels. This causes turning of the wheelchair 10. Additionally, one of the levers 16 or 18 could be utilized and the other driving wheel 12 could be held fast by gripping of the hand rail 30 by the occupant of the wheelchair 10 or even rotated in the reverse direction, to cause a very tight rotation of the wheelchair 10 about that driving wheel 12 which is gripped by its hand rail 30 by the occupant of the wheelchair 10.

As the occupant of the wheelchair 10 utilizes the levers 16 and 18 to propel the wheelchair 10 forward, the occupant at any time can simply hold the levers 16 or 18 fixed in their position whether it be their neutral position or a position pushed forward from the neutral position toward the front of the wheelchair 10 and the wheelchair 10 will continue to move forward by free wheeling of the driving wheels 12 with respect to their mounting on the wheelchair 10.

The free wheeling of the driving wheels 10 irrespective of the position of the levers 16 and 18 allows for use of the wheelchair 10 in competitive situations, which are becoming more and more common among those individuals confined to wheelchairs. Thus, an occupant confined to a wheelchair could utilize the wheelchair 10 in a sports event, such as a race or the like, or in a team sport, such as basketball or the like. Because of the ability to propel the wheelchair 10 at a fairly rapid velocity, and then coast after once achieving this velocity, the occupant of the wheelchair 10 can rest in between power strokes without having to return the levers 16 and 18 to the neutral position or having the stopping of the movement of the levers 16 and 18 concurrently cause a braking or stopping effect on the driving wheels 12.

If the occupant of the wheelchair 10 wishes to decrease the velocity of the wheelchair 10, or to brake it or hold it in a fixed position, the right and left levers 16 and 18 can be pulled backwards from the neutral position such that the brake 26 contacts the outside perimeter of the driving wheels 12 and fixedly holds them in position. Either of the levers 16 or 18 can be pulled backward to independently contact its appropriate brake 26 against its appropriate driving wheel 12 to slow up or fix that particular driving wheel. This allows for steering of the wheelchair 10 as well as for stopping and holding it in a fixed position.

Figure 4:
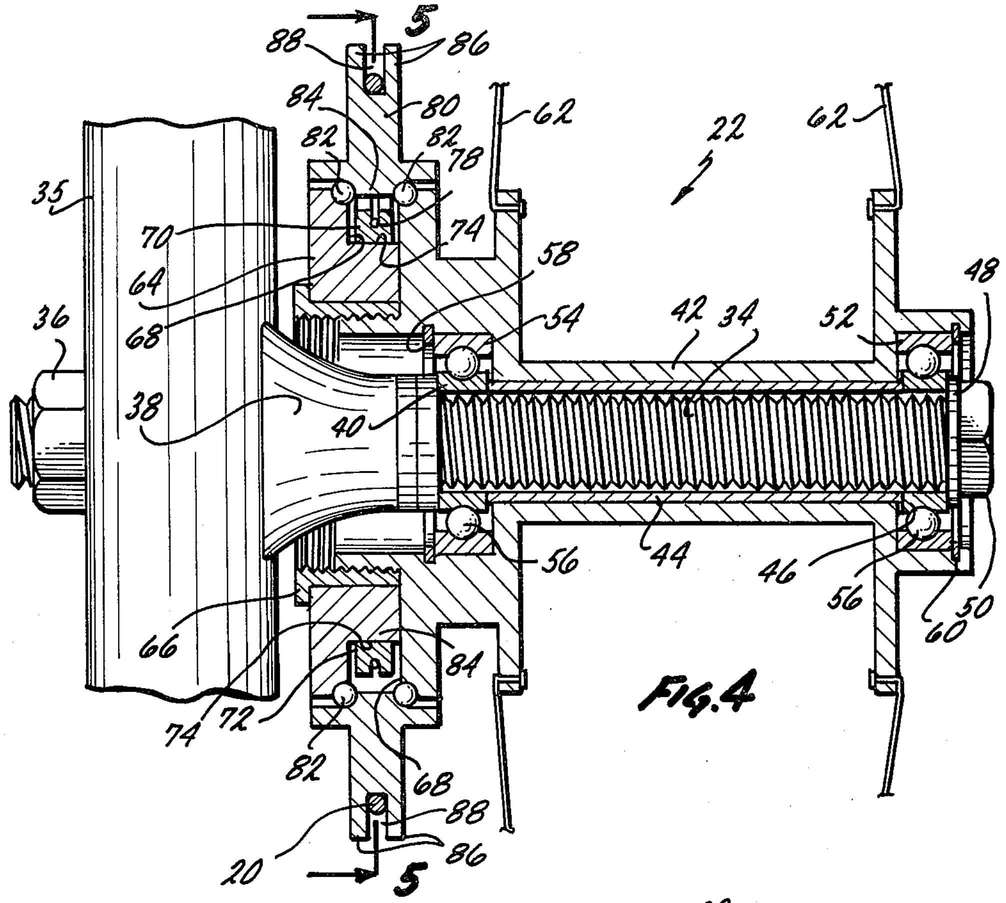
FIG. 4 is an end elevational view in partial section about the line 4—4 of FIG. 2.
Figure 5:
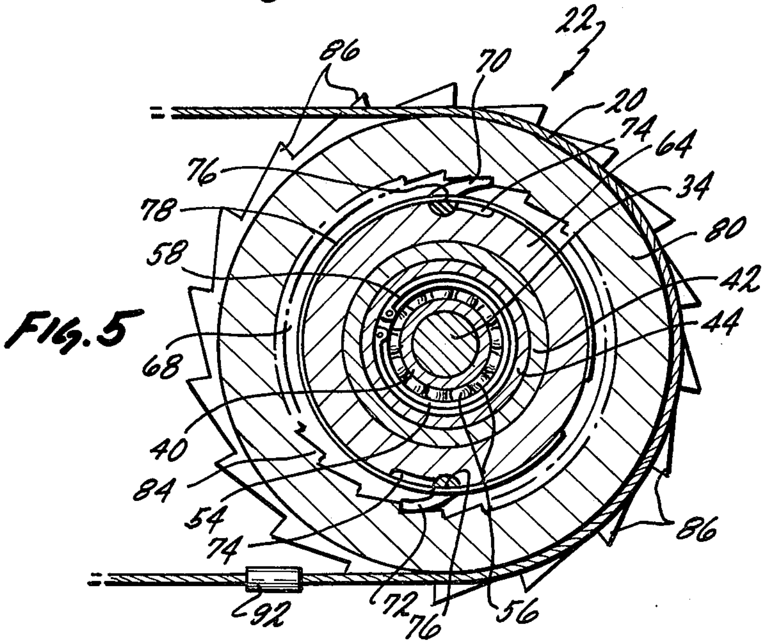
FIG. 5 is a side elevational view in section about the line 5—5 of FIG. 4.

Referring now to FIGS. 4 and 5, an axle 34 is mounted to an upright frame member 35 of the chair 10 by appropriately attaching the axle 34 with a nut 36 which appropriately threads on to threads formed on the axle 34. A collar 38 having a bearing race 40 formed on its end is fed over axle 34. A wheel hub 42 having a sleeve 44 located therein fits onto the axle 34 next to the collar 38. A bearing race 46 fits next to the sleeve 44 and the totality of the unit is secured to the axle 34 via a washer 48 and an outside nut 50.

The wheel hub 42 is appropriately suspended on the bearing races 40 and 46 via bearing races 52 and 54 by the insertion of appropriate bearings collectively identified by the numeral 56 between the respective bearing races. An inside snap ring 58 and an outside snap ring 60 maintain the bearings 56 and bearing races 54 and 52 appropriately positioned within the wheel hub 42. Spokes collectively identified by the numeral 62 project from the wheel hub 42 in the normal manner to support the rim (not numbered or seen) and tread 28 of the driving wheels 12.

A flanged boss 64 abutts against the inside edge of the wheel hub 42 over the area occupied by the collar 38. The flange boss 64 is held in position by a second flange boss 66 having threads on its inside surface which thread against a portion of the hub 42. This positions the flange boss 64 in a coaxial arrangement with the axle 34. Because of the presence of the threaded flange boss 66 the flange boss 64 is fixedly held against the hub 42 and rotated in conjunction therewith. Because of the shape of the flange boss 64 an annular cavity 68 is formed between the inside surface of the flange portion of the flange boss 64 and a portion of the hub 42.

Figure 7:
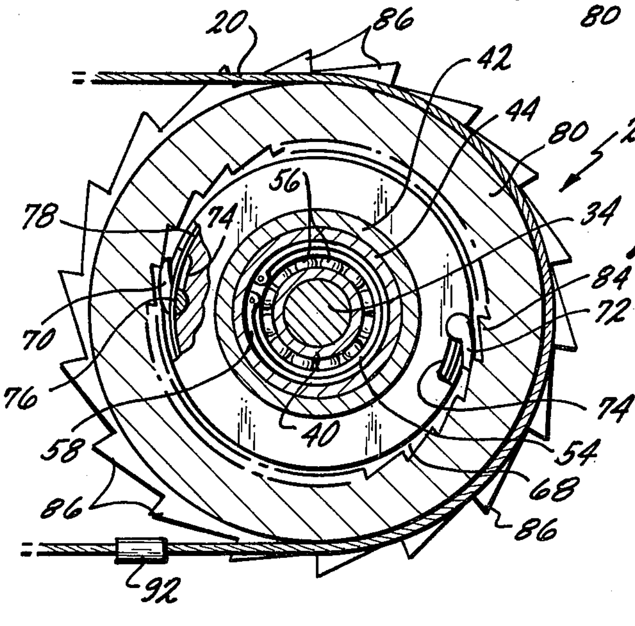
FIG. 7 is a view similar to FIGS. 5 and 6 with these components located in even a further spatial configuration.

Two pawls 70 and 72 fit within the annular cavity 68 by fitting within small grooves 74 formed in the flanged boss 64. Each of the pawls 70 and 72 include a flat surface collectively identified by the numeral 76. A spring ring 78 fits within the annular cavity 68 over the top of both the pawls 70 and 72 against the flat surface 76. This biases the pawls outward by the pressure of the spring ring 78 on the flat surfaces 76. If the pawls are rotated, as seen in FIG. 5, such that the end of the top pawl goes down and the end of the bottom pawl goes up, the flat surfaces 76 push against the spring ring 78 which biases the pawls back into their position as they are seen in FIG. 5. In FIG. 7, both the pawls 70 and 72 have had their outside ends pushed inwardly such that their flat surfaces 76 are pushing against the bias of the spring ring 78. As can be seen with regard to the pawl 70 in FIG. 4, the pawls 70 and 72 are bifurcated such that their flat surface 76 is between the bifurcations, such that the spring ring 78 is capabale of fitting between the bifurcations, maintaining it in position over the pawls 70 and 72 and holding the pawls 70 and 72 within the grooves 74.

An annular member 80 fits around the flanged boss 64 and is rotatably movable about the flanged boss 64 and the hub 42 via ball bearings collectively identified by the numeral 82. The annular member 80 carries a first set of ratchet teeth 84 on its inside surface which are positioned such that they interact with the pawls 70 and 72. The annular member 80 contains a second set of ratchet teeth 86 which are bifurcated such that they are located in pairs along the outside of the annular member 80. A space 88 is thus formed between each of the sets of individual teeth of the second ratchet teeth 86. The space 88 accepts the cable 20 between the individual members of a set of the second ratchet teeth 86. The bifurcation of the second ratchet teeth 86 fixedly positions the cable 20 in relation to these second ratchet teeth 86 and does not allow it to slip off one way or the other of the annular member 80.

As referred to above, the cable 20 is attached to one of the levers 16 or 18, in an analagous manner for both, at one of its ends, and attach to the spring 24 at its other end. Referring now to FIGS. 2 and 3, it can be seen that the spring 24 is connected to frame member 90 at one of its ends. The other end of the spring 24 is connected to the cable 20. The spring 24 is a tension spring, and when stretched tends to revert back to its original shape. In FIG. 3, the lever 16 is in its neutral position. The cable 20 can be seen wrapping around the annular member 80 with the second ratchet teeth 86 exposed.

The cable 20 includes a sleeve 92 which is swaged to the cable 20 to hold it in its position on the cable. When the lever, be it lever 16 or 18, is in the neutral position, the sleeve 92 is positioned at the bottom of and to the left of the annular member 80 and does not contact the second ratchet teeth 86. The force of the spring 24 is such that the cable 20 is simply held against the surface of the annular member 80. The annular member 80 is capable of sliding with respect to the cable 20, there being only a slight frictional contact between the two formed by the tension of the spring 24. The tension of the spring 24, however, is sufficient to keep cable 20 located within the annular space 88 between the bifurcated individual teeth of the second ratchet teeth 86.

When the lever 16 or 18 is in the neutral position, the driving wheels 12 are free to free wheel either clockwise or counterclockwise as follows. If they free wheel clockwise, the interaction of the pawls 70 and 72 with the first ratchet teeth 84 is such that the pawls 70 and 72 can slip with respect to the ratchet teeth, allowing the flange boss 64 to which they are attached to rotate independently of the annular member 80. For FIGS. 5, 6 and 7, this would be free rotation of the flange boss 64 in a counterclockwise direction with respect to the annular member 80.

Additionally, the annular member 80 is free to rotate either clockwise or counterclockwise with respect to the cable 20 because of the light frictional fit between these two components. This allows the wheelchair 10 to be moved freely either forward or backward by either the occupant of the chair utilizing the push rims formed as a part of the driving wheels 12 or by an auxiliary person pushing on the handles 32.

Figure 6:
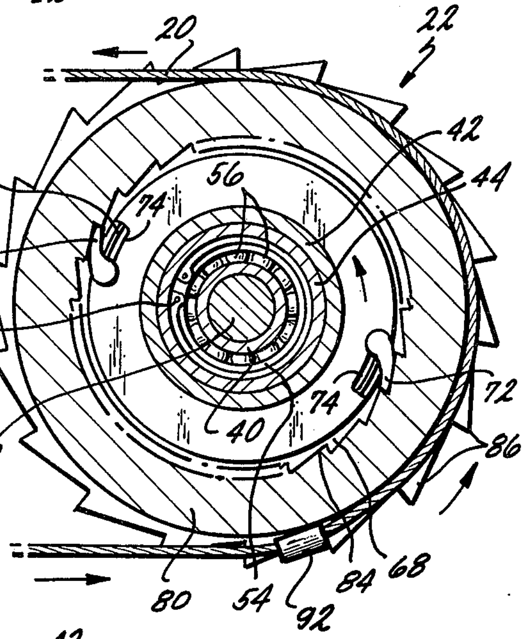
FIG. 6 is a side elevational view similar to FIG. 5 with certain of the components located in a different spatial relationship from that seen in FIG. 5.

When the left or right levers 16 or 18 are pushed forward, the cable 20 is moved with respect to the annular member 80, stretching the spring 24. At a point as is illustrated in FIG. 6, the sleeve 92 engages against the second ratchet teeth 86 and becomes fixed between two adjacent sets of teeth. This then fixes the cable 20 with respect to the annular member 80. Further movement of the levers 16 or 18 continues the movement of the cable 20 and, in FIGS. 5, 6 and 7, results in a counterclockwise torque applied to the annular member 80. This rotates the annular member 80 counterclockwise.

The counterclockwise rotation of the annular member 80 such as that seen in FIG. 6 is communicated via the first ratchet teeth 84 and the pawls 70 and 72 to the flanged boss 64, which in turn, because it is fixedly tightened against the wheel hub 42, rotates the wheel hub 42 and the driving wheel 12 attached thereto. Thus, the forward movement of the lever 16 or 18 in the power stroke, away from the body of the occupant of the wheelchair 10 results in movement of the driving wheels 12 in a direction pushing the wheelchair 10 forward, to the left in FIG. 1. This rotation of the annular member 80 by interlocking of the sleeve 92 with the second ratchet teeth 86 is seen in FIG. 2, and is depicted as movement from the phantom line for the lever 16 to movement of the lever 16 to its position shown in solid line.

When the lever 16 or 18 is released, the cable 20 and the lever 16 or 18 are returned to their original position by the bias created in the spring 24. This movement is depicted in FIG. 3. Additionally, at this time, as depicted in FIG. 7, the annular member 80 is rotating clockwise with respect to the flanged boss 64, which, it will be remembered, is fixed to the driving wheel 12 and the annular member 80 slips with respect to flanged boss 64 by sliding of the first ratchet teeth 84 with respect to the pawls 70 and 72 as the pawls 70 and 72 are flexed inward against the bias of the spring ring 78.

If the driving wheel 12 and the flanged boss 64 attached thereto are rotating faster in a counterclockwise direction, as seen in the Figs. (a forward direction for the wheelchair 10) at a faster rate than the annular member 80 is turned counterclockwise during a power stroke of one of the levers 16 or 18, the faster rotation of the driving wheel 12 and therefore the flanged boss 64 will allow the flanged boss 64 to move counterclockwise with respect to the annular member 80 at a faster rate of counterclockwise movement because of the allowed slippage of the pawls 70 and 72 with respect to the first ratchet teeth 84. Thus, if the wheelchair 10 is already in motion, an inefficient or slow power stroke will not result in loss of momentum of the chair, but simply will result in slippage of the annular member 80 with respect to the flanged boss 64 by slippage of the pawls 70 and 72 with respect to the first ratchet teeth 84.

It is only when the annular member 80 is driven faster in the same direction with respect to the flanged boss 64 that power is communicated from the annular member 80 to the flanged boss 64 via the interaction of the pawls 70 and 72 with the first ratchet teeth 84.

Because the annular member 80 can move in the opposite direction with respect to the flanged boss 64 by the slippage of the pawls 70 and 72 with respect to the first ratchet teeth 84, it is not necessary to return all the way back to the neutral position in a return stroke before initiating a further power stroke. Even a partial return toward the neutral position of one of the levers 16 or 18 will allow for repositioning of the pawls 70 and 72 in different sets of teeth of the first ratchet teeth 84 and then when movement of the levers 16 or 18 is resumed in the direction of the power stroke, further power is then transferred to the flanged boss 64 by the annular member 80 by gripping of the pawls 70 and 72 against the first ratchet teeth 84.

In summary then, it can be seen that the driving wheels 12 are free to spin both forward and backward when the lever 16 or 18 with which the individual driving wheel is associated is in its neutral position. Further, the driving wheel 12 is free to maintain a forward spin even if the levers 16 or 18 are not in their neutral position, because of slippage of the annular member 80 and the flanged boss 64 by the pawls 70 and 72 slipping against the first ratchet teeth 84. This also allows for movement in the reverse direction of the annular member 80 with respect to the flanged boss 64 which happens when the levers 16 and 18 move back toward the occupant of the chair 10 toward the neutral position.

A very important feature of the invention resides in being able to utilize the levers 16 and 18 in partial power strokes while propelling the chair up a ramp, hill, or other inclined surface. As long as the levers 16 and 18 are not returned all the way back to their neutral position during the return stroke, the sleeve 92 will remain engaged with the second ratchet teeth 86 on the annular member 80. This results in preventing free wheeling of the driving wheels 12 in a reverse direction such that the wheel chair 10 will not roll backwards.

The occupant of the wheel chair 10 simply propels himself up a ramp, inclined plane or the like by simply always maintaining the levers 16 and 18 somewhat away from his body, thus out of the neutral position, and makes a successive number of power and return strokes while maintaining the sleeve 92 at all times in operative engagement with the second ratchet teeth 86.

I claim:

1. An occupant propellable riding device which comprises:
   - a frame capable of supporting said occupant;
   - a plurality of wheels rotatably mounted on said frame;
   - at least one of said wheels comprising a driving wheel;
   - at least one movable means on said frame, at least a portion of said movable means reciprocally movable back and forth away from and towards the occupant from a neutral position towards said occupant to a displaced position positioned away from said occupant, said movable means movable in a power stroke wherein said movable means moves in the direction away from said neutral position and said occupant towards said displaced position and said movable means movable in a return stroke wherein said movable means moves in the direction from said displaced position back towards said neutral position and said occupant;
   - at least one transfer means rotatably mounted on said frame in association with said driving wheel and said movable means;
   - said transfer means including a first and a second ratchet means;
   - said first ratchet means operatively associated with said driving wheel, said first racthet means allowing said driving wheel to free wheel in a forward direction of movement of said device;
   - said second ratchet means operatively associated with said first ratchet means and said movable means, said second ratchet means allowing said driving wheel to free wheel in both said forward direction and the reverse direction when said movable means is in said neutral position and said second ratchet means, acting through said first ratchet means by engaging with said first ratching means rotating said driving wheel in said forward direction in response to said movable means moving in said power stroke and said second ratchet means disengaging with said first ratchet means when said movable means moves in said return stroke.

2. The device of claim 1 wherein:
said device includes a first and a second driving wheel, a first and a second movable means and a first and a second transfer means;
said first movable means and said first transfer means associated with said first driving wheel and said second movable means and said second transfer means associated with said second driving wheel.

3. The device of claim 2 wherein:
each of said movable means each comprise lever means pivotally mounted on said frame such that the upper portion of each of said lever means is movable reciprocally in an arc back and forth toward and away from said occupant.

4. The device of claim 2 wherein:
said device comprises a wheelchair having independent first and second axle means, said first driving wheel rotatably mounted about said first axle means and said second driving wheel rotatably mounted about said second axle means.

5. The device of claim 4 wherein:
each of said transfer means further includes a member rotatably mounted about one of said respective axle means in association with one of said respective driving wheels.

6. The device of claim 5 wherein:
said first ratchet means includes one of said member or said driving wheels including a first set of ratchet teeth means located thereon and the other of said member or said driving wheel includes a ratchet engagement means capable of engaging with said first set of ratchet teeth means when rotation of said member with respect to said driving wheel is in a first direction and not engaging with said second set of ratchet teeth means when rotation of said member with respect to said driving wheel is in the opposite direction.

7. The device of claim 6 wherein:
said second ratchet teeth means includes each of said members each having a second set of ratchet teeth means and further including a movable connecting means attaching to said lever means and associated with said member, said connecting means including second engaging means capable of engaging with said second set of ratchet teeth means when said lever moves in said power stroke to rotate said member, said second engaging means disassociating with said second set of ratchet teeth means when said lever is in said neutral position.

8. The device of claim 7 including:
brake means operatively associated with said lever means and engagable against said respective driving wheels upon movement of said respective lever means from said neutral position further toward said occupant.

9. The device of claim 8 wherein:
connecting means includes a flexible connector having ends with one of said ends attaching to said lever means and the other of said ends including a biasing means interspaced between said other of said ends and said frame, said flexible connector engaging said member by slidably contacting said member;
said second engaging means comprises a contact member located on said flexible connector and positioned such that said contact member is disengaged fron said second set of ratchet teeth means when said lever is in said neutral position and engages said second set of ratchet teeth means when said lever means moves in said power stroke.

* * * * *